United States Patent [19]
Christopher et al.

[11] Patent Number: 5,227,617
[45] Date of Patent: Jul. 13, 1993

[54] HAND-HELD LABEL APPLICATOR WITH SCANNED DATA ACQUISTION AND SELECTIVE DATA RETRIEVAL ACQUISTION

[75] Inventors: Amy S. Christopher; James E. Helmbold, both of Centerville; Donald A. Morrison, Dayton; Richard D. Wirrig, Huber Heights, all of Ohio

[73] Assignee: Monarch Marking Systems, Inc., Miamisburg, Ohio

[21] Appl. No.: 458,331

[22] Filed: Dec. 28, 1989

[51] Int. Cl.$^5$ .............................. G06K 7/10; B41J 5/00
[52] U.S. Cl. ..................................... 235/462; 235/436; 235/472; 400/73; 400/103
[58] Field of Search ............... 235/432, 436, 462, 439, 235/472; 400/103, 104, 73

[56]   References Cited
U.S. PATENT DOCUMENTS

| | | | |
|---|---|---|---|
| 4,57,329 | 7/1988 | Sato et al. | 346/76 |
| 4,088,878 | 5/1978 | Schasser | 235/436 |
| 4,264,396 | 4/1981 | Stewart | 235/432 |
| 4,440,248 | 4/1984 | Teraoka | 235/462 |
| 4,652,317 | 3/1987 | Seestrom | 156/64 |
| 4,706,095 | 11/1987 | Ono et al. | 400/103 X |
| 4,706,096 | 11/1987 | Sato | 235/432 |
| 4,734,710 | 3/1988 | Sato et al. | 346/76 |
| 4,734,713 | 3/1988 | Sato et al. | 346/76 |
| 4,746,932 | 5/1988 | Sato | 235/432 |

FOREIGN PATENT DOCUMENTS 60-87072  5/1985  Japan ................... 400/103

OTHER PUBLICATIONS

"Method of Storing Bar Code Image Data and Printing Bar Codes" IBM Technical Disclosure Bulletin, vol. 29, No. 3, p. 1096, Aug., 1986.
Reading Between the Lines by Harmon & Adams, Jan. 3, 1989, pp. 59, 84–85, 57, 228, 215, 277, 173–176.

*Primary Examiner*—John Shepperd
*Assistant Examiner*—Edward H. Sikorski
*Attorney, Agent, or Firm*—McAndrews, Held & Malloy, Ltd.

[57]     ABSTRACT

A hand-held labeler with an integrally formed optical scanner prints labels with a coded record selected from a plurality of optically scanned and stored coded records. In a data acquisition mode, the optical scanner scans a plurality of coded records, such as bar codes, to generate data representing the coded records for storage in a memory. Selective printing of scanned code and/or information associated therewith is accomplished utilizing a display that is controlled by a keyboard to display information that identifies the data stored in the memory. When information identifying a desired coded record is shown on the display, a print switch may be actuated to cause the code associated with the displayed information to be printed on one or more labels. Further, the scanner may also be used to scan different types of bar codes where each bar code includes a coded information portion and at least one guard code identifying the type of code. A digital representation of the whole bar code may be stored in a list in the labeler's memory. Alternatively, the labeler may separate the guard codes from the information portion of the code such that only the information portion of the code is stored in the list in memory to save space. Upon subsequent selection of a particular bar code, the code may be reassembled with the same guard codes as scanned or with different guard codes to convert the code from one type to a different type.

4 Claims, 3 Drawing Sheets

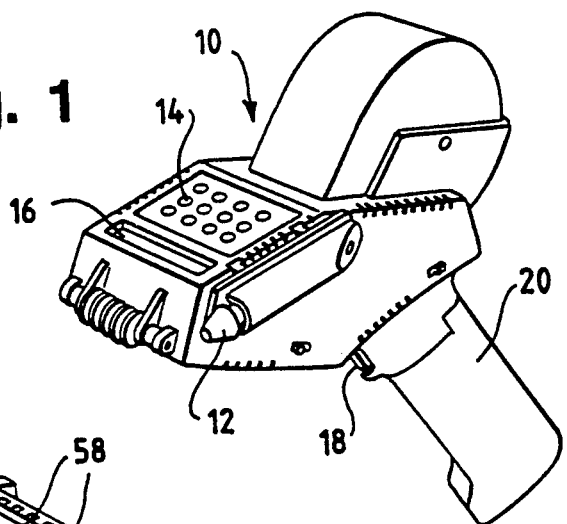
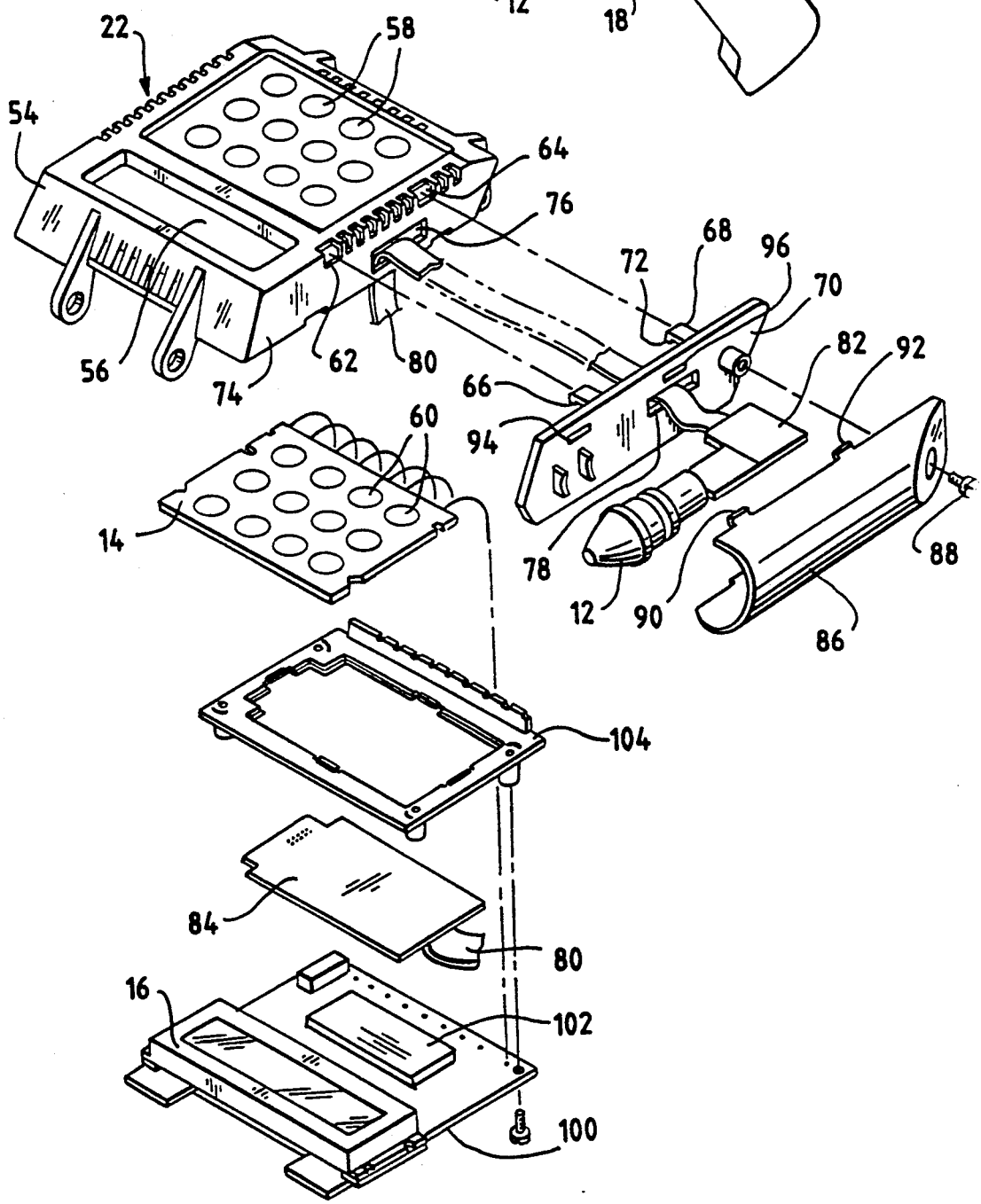

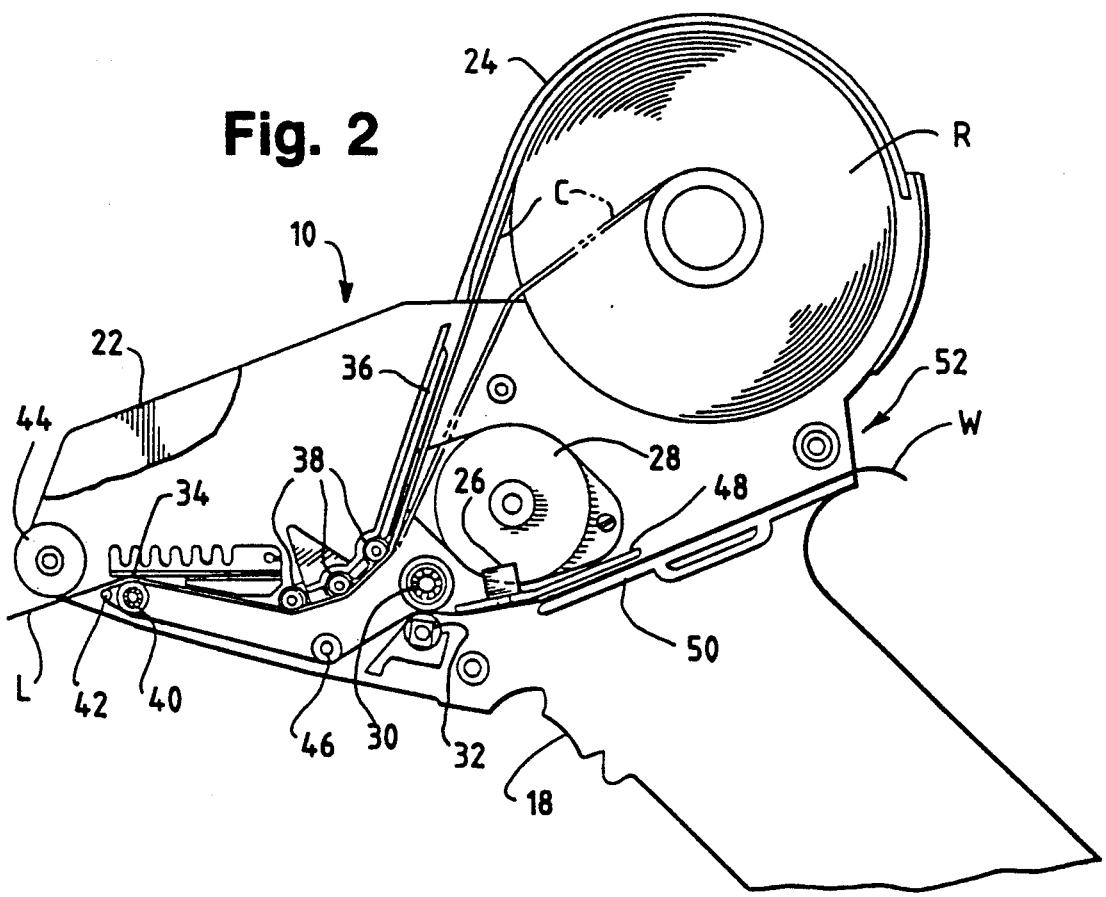
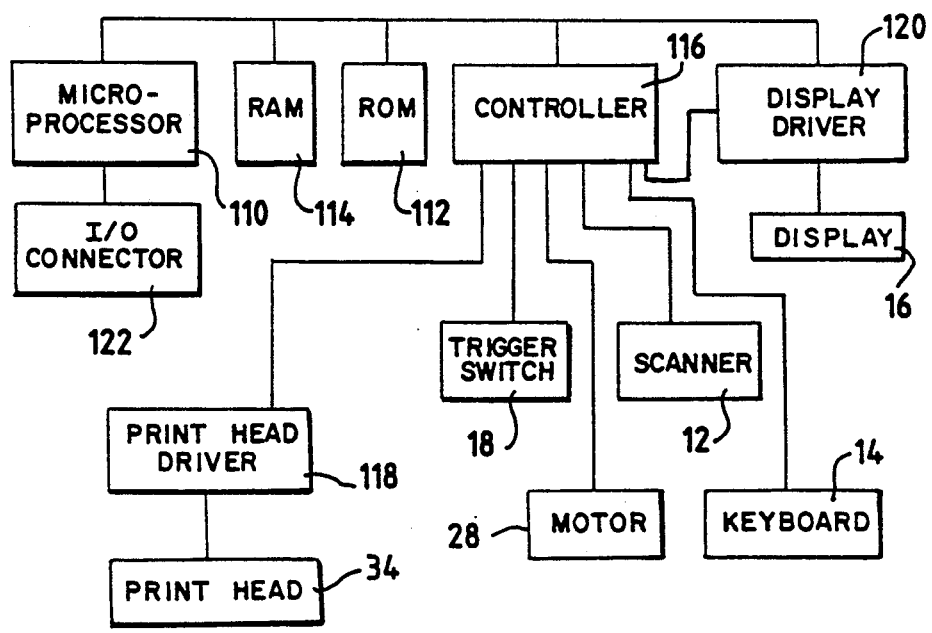

HAND-HELD LABEL APPLICATOR WITH SCANNED DATA ACQUISTION AND SELECTIVE DATA RETRIEVAL ACQUISTION

TECHNICAL FIELD

The present invention relates to an apparatus and method for printing labels and more particularly to a hand-held labeler with an integrally formed optical scanner for printing labels with a coded record selected from a plurality of optically scanned and stored coded records.

BACKGROUND OF THE INVENTION

Hand-held labelers have been used to print bar codes as well as human readable information on a label that is applied to an article to designate price, department number, etc. When more than one piece of information, such as a plurality of bar codes, are to be entered into known labelers, data entry has been accomplished via a keyboard or a host computer. Bar codes typically include an information portion of the code plus guard codes. The guard codes are disposed at the start and end of the information portion of the bar code as well as in the middle thereof where the middle guard code identifies the direction that the bar code should be read. For keyboard data entry, an alphanumeric representation of the information portion of the bar code is entered via the keyboard and a digital representation thereof is stored in a list in the labeler's memory. In the case of data entry via a host computer, a digital representation of the information portion of the bar code is downloaded from the host computer and stored in a list in the labeler's memory. To select information such as a particular bar code from the stored list, a user may step through the list by actuating a key on the keyboard of the labeler while the labeler displays human readable representations of the code information stored in the list. Once code information is selected for printing the labeler assembles a digital representation of a bar code by adding guard codes to the code information. After assembling the code, the labeler may print it on one or any number of labels. Data entry via a keyboard of a large group of codes can be very tedious, time consuming and unreliable. Although data entry via a host computer is generally reliable and efficient, it is not always possible. Hand-held labelers are often used in stores where a user is required to enter information already printed on a shelf label into the labeler so that the same information can be printed on articles to be placed on the shelf. In this type of situation data entry via a host computer is generally not possible.

Hand-held labelers are also known to include an optical reader or scanner such as a light pen for use in inputting data to be printed on a label. U.S. Pat. No. 4,652,317 shows such a hand-held labeler wherein the light pen is used to scan a code. The code may be printed on a label secured to a shelf that is intended to support articles to be labeled with information corresponding to the shelf label. Data representing the scanned code is stored in a RAM and remains there until a subsequent label is scanned. After a single label is scanned, one or more labels may be printed with the scanned information. Although the task of data entry is considerably eased by the scanning operation of this labeler, as opposed to those limited to manual data entry via a keyboard, the labeler is still limited in that only one label may be scanned and stored at a time.

SUMMARY OF THE INVENTION

The present invention constitutes an improvement over prior art labelers. The apparatus of the present invention includes an integrated labeler and scanner wherein information associated with a plurality of labels may be scanned and stored for data acquisition, the labeler providing selective printing of the information stored.

More particularly, the apparatus of the present invention includes a housing with means for mounting a roll of pressure sensitive labels that are releasably adhered to a carrier web. A thermographic print head or the like is provided for printing information on the labels. Means are further provided for advancing the carrier web through the housing to a delaminator to delaminate printed labels from the carrier web. The label is then applied to an article by an applicator roller or the like. Input means such as a trigger switch initiate a printing and label applying operation. A scanner is provided for scanning a coded record wherein the scanner generates data representing the coded record for storage in a memory. Means actuable by a user are further provided for selecting to be printed a desired one of the plurality of scanned coded records represented by data stored in the memory. A computer control is responsive to the input means and the selecting means for controlling the print head and advancing means to print the selected coded record on a label and to apply the label to an article.

The data selection means may include for example a display, controlled in response to actuation of one or more keys on a keyboard, to display alpha-numeric information to a user to identify the data stored in the memory for each scanned coded record. The display may be controlled via the keyboard to scroll through the identifying information. When the input means is actuated with information identifying a desired coded record shown on the display, that coded record is printed on a label.

The coded records are formed of a bar code or other code recognizable by the scanner that is printed on a record. Where the bar code represents an article identification, the memory may store other information relating to the article such as price and the manufacturer as well as the alpha-numeric representation of the bar code itself. It is the alpha-numeric representation of the bar code and/or other article identifying information that is displayed to the user during the data selection operation. The printer may be controlled to print only the bar code, the other information stored in the memory and relating to the article identified by the bar code or both if desired.

Codes that may be scanned typically include guard codes that are comprised of start and end codes disposed at respective ends of the information portion of the code. The guard codes may also include a portion that is disposed in the middle of the information portion of the code identify the direction in which the code should be read. In accordance with the present invention it is the whole code including the guard portions as well as the information portion that is input to the labeler during the scanning operation. A digital representation of the whole code may be stored in a list in the labeler's memory. Alternatively, the labeler may separate the guard codes from the information portion of the code wherein only the information portion of the code is stored in the list in memory to save space therein. Instead of repetitively storing the same digital representation of the guard codes for each scanned bar code, only one such representation need be stored for an entire block of codes. Further, since guard codes identify the type of code i.e. whether it is of a UPC type, a Code 39 type, etc., a digital representation of the identity of the code type need only be stored. Specific memory locations may also be allocated to particular code types to obviate the need for storing a digital representation of the guard codes or code type.

Upon subsequent selection and printing of a code, the code may be reassembled with the same guard codes as scanned or with different guard codes to convert the code from one type to a different type. Because it may be desirable to limit a labeler to print only one type of code, a built in check is provided by the labeler of the present invention wherein the type of code scanned is identified before the information portion of the code is stored. If the code scanned is not of a permitted type, the labeler may refuse to store the information or the labeler may accept the scanned code for conversion to an acceptable type of code.

In the preferred embodiment, the labeler includes an input/output port-interface to allow information associated with the bar codes and articles identified thereby to be downloaded to the labeler so that the information can be updated, old information can be deleted and new bar code/article information may be added.

Further, a plurality of coded records may be scanned and the code printed thereon stored for immediate selective printing, selective printing at a later time and/or for data acquisition reasons only wherein the stored data is transmitted via the interface to a host computer where the data may be compiled and/or analyzed.

These and other objects, advantages and novel features of the present invention, as well as details of an illustrative embodiment thereof will be more fully understood from the following description and from the drawing.

BRIEF DESCRIPTION OF THE DRAWING

FIG. 1 is a perspective view of the integrated hand-held labeler and scanner of the present invention;

FIG. 2 is a diagrammatic side elevational view of the labeler shown in FIG. 1;

FIG. 3 is an exploded perspective view of one section of the hand-held labeler of FIG. 1;

FIG. 4 is a block diagram of the labeler shown in FIG. 1;

DESCRIPTION OF THE PREFERRED EMBODIMENT

Figure 6:
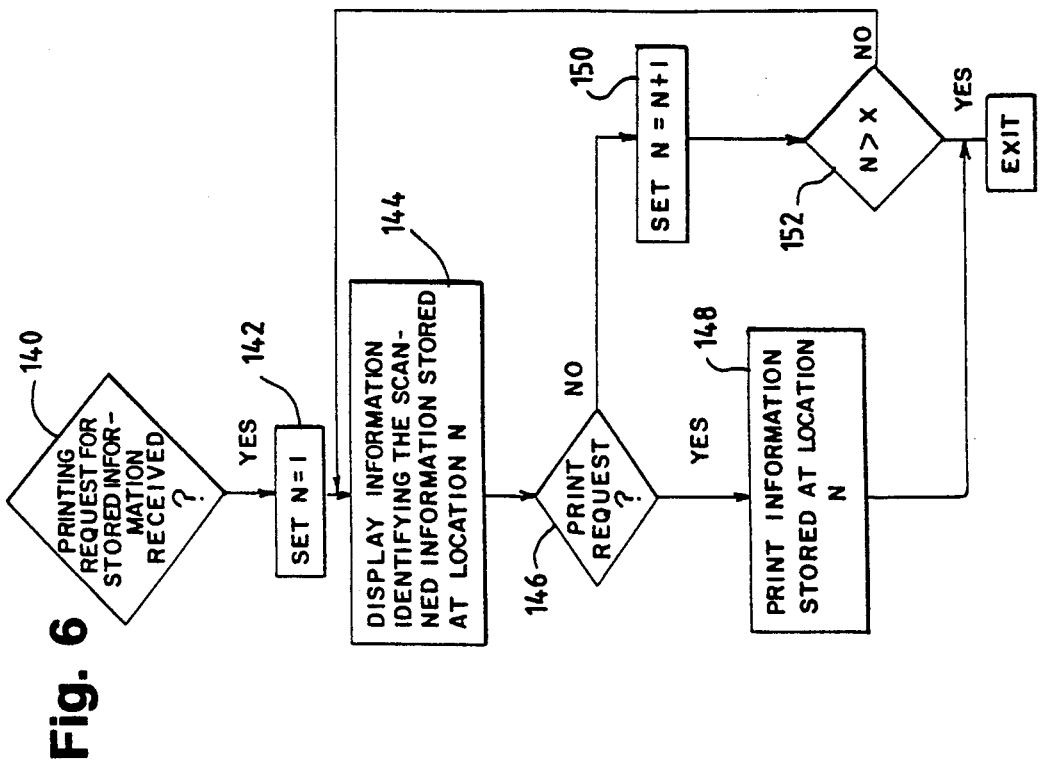
FIG. 6 is a flow chart illustrating a printing operation of the labeler of the present invention.

A hand-held labeler 10 in accordance with the present invention, as shown in FIG. 1, includes an integrally formed scanner 12 for scanning coded records. The scanner 12 is preferably an optical scanner; although, other scanners such as magnetic scanners may be used. The code printed on the scanned records may be formed of a bar code or another type of code capable of being sensed by the scanner employed. As discussed in detail below, data representing scanned coded records is stored in a memory included in the labeler 10 for selective retrieval and printing of a desired coded record and/or information associated therewith on a label. A keyboard 14 is provided to initiate various operations of the labeler 10, such as selective data retrieval wherein information identifying the coded records stored in the labeler's memory is depicted on a display 16. When the display 16 is displaying information identifying a particular coded record to be printed, the user initiates the printing and label applying operation of the labeler 10 by actuating a trigger switch 18. The trigger switch 18 is mounted on a handle 20 of the labeler 10 for convenience. If desired, however, a print actuation switch may be included among the key switches forming the keyboard 14.

As shown in FIG. 2, the labeler 10 includes a frame or housing 22. A label supply roll R is mounted on the housing 22, the roll R being shielded from ambient conditions, such as dust, by a cover 24. The roll R is comprised of a composite label web C shown by both a solid line representing a full roll R and phantom lines representing a nearly depleted roll. The composite web C includes a carrier web W having a coating of release material such as silicone wherein the labels, such as a label L, are releasably secured to the carrier web W by a pressure sensitive adhesive. The underside of the carrier web W may be provided with marks that are detected by an optical sensor 26 for various control functions of the labeler 10.

In response to actuation of the trigger switch 18, an electric motor 28 rotates a driving roll 30 coupled thereto wherein the driving roll 30 cooperates with an idler roll 32 to advance the composite web C past a print head 34. The print head 34 prints information on the leading label L as it passes thereby. More particularly, as the composite web C is paid out from the roll R, the web C passes between a pair of guides only one 36 of which is shown. Rollers 38 guide the composite web C around a curve where the composite web C passes between the printhead 34 and a cooperating platen 40. The printhead 34 is preferably a thermographic printhead, although other printheads may be employed. The printhead 34 includes a straight line of closely spaced print elements that extend perpendicular to the direction of movement of the composite web C. A delaminator 42 includes a peel roller positioned closely adjacent to the line of pressure contact between the printhead 34 and the platen 40. The carrier web W passes about a portion of the delaminator 42 to effect delamination of the leading label L. The leading label L is then passed into label applying relationship with respect to an applicator roll 44 so that the leading label L may be applied to an article. From the delaminator 42, the carrier web W again passes into contact with the platen 40 from which it is guided by a roll 46 to the driving roll 30 and the idler roll 32, the web W passing there between. The web W then moves past the optical sensor 26 and is pushed along guides 48 and 50 to an exit opening 52 in the housing 22.

As shown in FIG. 3, the housing 22 has an upper section 54 that includes a rectangular aperture 56 aligned with the display 16. The upper housing section 54 further includes a plurality of circular apertures 58 that are aligned with the key switches 60 of the keyboard 14. Alternatively a large single aperture could be formed in the upper housing section 54 to accommodate the entire keyboard. A pair of small rectangular apertures 62 and 64 are formed in the housing section 54 for receiving respective flanges 66 and 68 of a mounting bracket 70. Each of the flanges 66 and 68 includes a lip 72 that engages the inner surface of a sidewall 74 of the housing section 54 so as to retain the mounting bracket 70 secured to the upper housing section 54. The upper housing section 54 and mounting bracket 70 are formed with respective slots 76 and 78, the slots being aligned to allow an electrical ribbon connector 80 to pass from a printed circuit board 82 associated with the optical scanner 12 to a decoder/power down chip 84 contained within the labeler housing 22. The decoder/power down chip 84 identifies an optically scanned coded record or bar code and transmits digital signals representing the scanned code to the main processor chip 102. A power down circuit on the board 82 turns off both the optical scanner 12 and the decoder portion of the chip 84 when the optical scanner is not in use so as to conserve power. A cover 86 is secured to the mounting bracket 70 by means of a screw 88 and a pair of flanges 90 and 92 that extend through respective slots 94 and 96 formed in the mounting bracket 70. The cover 86 encloses the body 98 of the optical scanner and the printed circuit board 82 to provide an integrally formed labeler and optical scanning device. A mounting plate 100 supports the display 16 as well as a microprocessor chip 102 that is coupled to the decoder/power down chip 84 mounted there above. The keyboard 14 is mounted on another mounting plate 104 beneath which is disposed the decoder/power down chip 84.

As shown in FIG. 4, a microprocessor 110, included in the microprocessor chip 102 operates in accordance with software programs stored in a read only memory (ROM) 112 to control various operations of the labeler 10. For example, in response to actuation of the trigger switch 18, the microprocessor 110 controls the motor 28 through a controller 116 to advance the composite web C while controlling the printhead 3 through the controller 116 and the printhead driver 118 to print information on a label L from data stored in a random access memory (RAM) 114 and/or the ROM 112. The controller 116 provides an interface between the microprocessor 110 and the various input and output devices such as the trigger switch 18, scanner 12, keyboard 14, display 16, printhead 34 and motor 28. In response to the actuation of an optical scan keyswitch on the keyboard 114, the decoder/power down chip 84 which is depicted in FIG. 4 as a portion of the controller 116, powers the optical scanner 12. As discussed below with reference to FIG. 5, the microprocessor 110 stores the data received from the optical scanner 12 in the RAM 114 for selective retrieval and printing. The microprocessor 110 is also coupled to an input/output connector or interface such as an RS232 interface so that data may be entered into the labeler 10 by an external source such as a host computer or the like as shown in detail in U.S. patent application Ser. No. 209,945 filed Jun. 22, 1988, incorporated herein by reference.

Typically, the coded record being scanned is formed of a bar code that identifies an article. The RAM 114 may store additional information relating to the articles identified by the bar code data stored therein, such information including price and manufacturer as well as an alpha-numeric representation of the bar code itself or other human readable information identifying the article. The additional information stored in the RAM 114 may be easily updated by downloading new information from a host computer via the input/output connector 122. Further, data stored in the RAM 114 including the data representing the optically scanned coded records may be transmitted from the RAM 114 to a host computer or the like via the input/output connector 122 such that the labeler 10 functions as a data acquisition unit.

Figure 5:
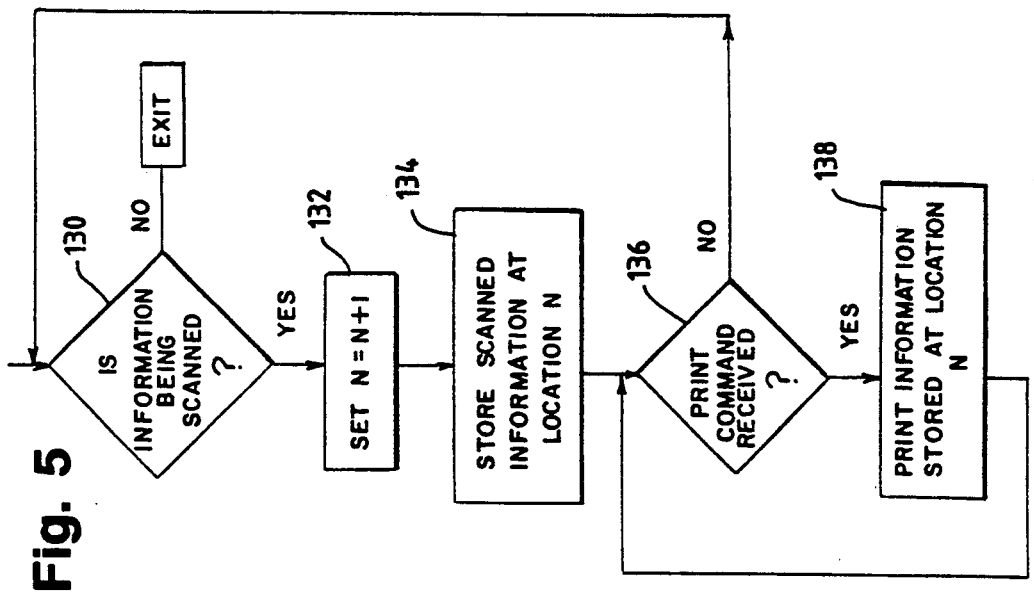
FIG. 5 is a flow chart illustrating the scanning and storing operation of the labeler of the present invention.

The microprocessor 110 controls its data acquisition operations in accordance with the flow chart depicted in FIG. 5. As shown therein, at a block 130, the microprocessor 110 determines whether information is being scanned. If information is being scanned, the microprocessor 110 increments a pointer N at a block 132 to the next sequentially available storage location in a list in the RAM 114 that is associated with the type of code scanned as identified by the decoder chip 84 from the guard codes. Thereafter, at a block 134, the microprocessor 110 stores the data representing the information portion of the scanned code at the location N in the list. At a block 136, the microprocessor determines whether a print command has been received immediately thereafter and if so, the microprocessor 110 at a block 138 reassembles the scanned code from the data stored in the RAM 114 at location N for the information portion of the code with data representing the guard portions of the code. After reassembling the scanned code the microprocessor at block 13 prints the reassembled code.

Alternatively or in addition to printing the scanned coded record, the microprocessor 110 in accordance with the received print command controls the printhead 34 to print other information stored in the RAM 114 and associated with the scanned coded record. It is noted that a print command may represent a signal(s) generated in response to the actuation of the trigger switch 18 alone or the trigger switch 18 in combination with one or more keyswitches on the keyboard 14 wherein the actuated keyswitches identify the stored information to be printed as well as the number of labels to be printed with the same information. At block 138, the microprocessor also controls the motor 28 to drive the driving roller 30 so as to advance the composite web C past the printhead 34 as the printhead 34 is being actuated to print the information on the label. Further, in accordance with the print command received at block 136 the microprocessor 110 may print one or any number of labels with the information stored at location N, the microprocessor looping through blocks 136 and 138. If no print command is received, the microprocessor returns to block 130 from block 136 to store the data representing other scanned codes. As seen, the scanned code may be stored in the RAM 114 for immediate printing on a label L, for printing at some later time or date as depicted in FIG. 6 or for subsequent transmission to a host computer or the like through the input/output connector 122.

If a print request is received at a time subsequent to the scanning and storing operation depicted in FIG. 5, as determined by the microprocessor at block 140, the microprocessor 110 at a block 142 sets a pointer, N equal to 1. If more than one list is stored in RAM 114 where each list is associated with a different type of scanned code, then at block 140, the microprocess sets a list pointer to Y=1. At block 144, the microprocessor 110 displays information identifying the scanned coded record represented by data stored at location N in a data list stored in the RAM 114. Preferably, the displayed information is an alpha-numeric representation of the scanned coded record or other human readable identification of the article associated with the coded record.

At block 146 the microprocessor 110 determines whether a print request has been received indicating that the trigger switch 18 has been actuated. If so, at block 148 the microprocessor 110 reassembles the scanned code from data representing the information portion of the code that is stored in the RAM 114 at the location identified by the pointer N with data representing the guard codes identified by the list in which the information data is stored or with data representing different guard codes as may be selected by a user to convert the scanned code to a different type of code for printing. After reassembling a code, the microprocessor 110 at block 148 prints the code. In accordance with the print request received at block 146, the microprocessor at block 148 may also print other information associated with the coded record as may be stored in the RAM 114, the particular print request received being dependent on the particular keyswitches of the keyboard 14 that are actuated as discussed above. If no print request is received, the microprocessor at block 150 increments the pointer N and if N is not greater than X which represents the last location in the list Y RAM 114 where scanned coded record data is stored, the microprocessor 110 returns to block 144 from a block 152 to display the information stored at the next location in the list Y. If N is greater than X and more than one list is stored in RAM 114, at block 152 the microprocessor 110 increments Y to $Y=Y+1$ and determines whether Y is greater than Z, the number of data lists in RAM 114. If Y is less than or equal to Z, the microprocessor 110 returns to block 142 so that the next data list may be searched. The microprocessor 110 may further control the display to scroll through the data stored in the memory 114 at a slow rate or a fast rate.

Although in the embodiment described above, only a portion of a scanned code is stored in the list to save memory space, a digital representation of the whole code including the guard codes may be stored to obviate the need to reassemble the code before printing.

Many modifications and variations of the present invention are possible in light of the above teachings. Thus it is to be understood that, within the scope of the appended claims, the invention may be practiced otherwise than as described hereinabove.

What is claimed and desired be secured by Letters Patent is:

1. Apparatus for scanning coded records and for printing and applying labels, comprising:
    a housing, means on the housing for mounting a roll of pressure sensitive labels releasably adhered to a carrier web, means including a thermographic printhead for printing on a label, means for delaminating a printed label from the carrier web, means for advancing the carrier web to effect label delamination at the delaminating means, means for applying a printed label, input means actuatable by a user for initiating a print operation, means for scanning coded record, said scanning means generating data representing a scanned coded record and said scanning means being capable of scanning different types of codes, each code including a coded information portion and at least one guard code, said guard code identifying the type of code, means responsive to a scanned guard code for identifying the type of code scanned, means for storing data representing a plurality of scanned coded records, said storing means storing in a list data representing only the coded information portion of a scanned code, means actuable by a user for selecting to be printed a desired one of said plurality of codes represented by data stored in said storing means, and means responsive to said input means and said selecting means for controlling the operation of said printing means and advancing means to print said selected codes on a label advanced to said printing means, said control means including means for adding data representing at least one guard code to a stored coded information portion to reassemble a scanned code for printing.

2. A method of printing labels with a code selected from a plurality of scanned codes utilizing an apparatus having a memory, and input means actuable by a user for selecting one code from a plurality of codes stored in said memory and for initiating a print operation, the method comprising the steps of:
    scanning a plurality of coded records, said code having a code type identify portion and a coded information portion;
    identifying the type of code scanned from said code type identifying portion of each of said scanned coded records;
    storing a representation of the coded information portion of each of said scanned codes in a list in said memory;
    storing a representation of each different code type identifying portion of said scanned coded records in said memory;
    reassembling, in response to a user selection of a code from said memory, said selected code from the stored coded information portion of the selected code and a code type identifying portion;
    printing a plurality of labels with said selected code in response to repetitive actuation of said input means.

3. The method of claim 2 including a plurality of said lists, each list storing representations of the coded information portion of the scanned codes in said memory and each list being associated with a different type of code scanned.

4. The method of claim 2 wherein said reassembling step includes the step of combining a different code type identifying portion than the code type portion scanned with a modified coded information portion to print a selected scanned code in a different format type.

* * * * *

UNITED STATES PATENT AND TRADEMARK OFFICE
CERTIFICATE OF CORRECTION

PATENT NO. : 5,227,617
DATED : July 13, 1993
INVENTOR(S) : Christopher et al

It is certified that error appears in the above-indentified patent and that said Letters Patent is hereby corrected as shown below:

On the title page, item [54] and column 1, line 3, "ACQUISTION" should be --ACQUISITION--.

In item [56] References Cited, U.S. Patent "4,57,329" should be --4,757,329--.

Column 5, line 37, "3" should be --34--.

Column 6, line 25, "13" should be --138--.

Signed and Sealed this

Nineteenth Day of July, 1994

Attest:

BRUCE LEHMAN

*Attesting Officer*   *Commissioner of Patents and Trademarks*